United States Patent [19]
Bung et al.

[11] Patent Number: 5,265,495
[45] Date of Patent: Nov. 30, 1993

[54] ISOLATED SHIFTER TERMINAL ASSEMBLY

[75] Inventors: Hubert Bung, Rochester Hills; Arthur L. Spease, Bloomfield Hills; Joseph M. Laperriere, III, Roseville, all of Mich.

[73] Assignee: Teleflex Incorporated, Limerick, Pa.

[21] Appl. No.: 948,373

[22] Filed: Sep. 21, 1992

[51] Int. Cl.$^5$ .............................................. F16C 1/10
[52] U.S. Cl. ................... 74/502.6; 74/502.4; 403/120
[58] Field of Search ............... 74/502.6, 502.4, 500.5; 403/119, 120, 133, 135, 138

[56] References Cited

U.S. PATENT DOCUMENTS

| | | | |
|---|---|---|---|
| 3,570,324 | 3/1971 | Conrad | 74/502.4 |
| 3,853,414 | 12/1974 | Hirano | 403/71 |
| 4,327,600 | 5/1982 | Bennett | 74/501 |
| 4,360,284 | 11/1982 | Brandenburg | 403/133 |
| 4,520,689 | 6/1985 | Sucro | 74/595 |
| 4,581,953 | 4/1986 | Walston | 74/501 |
| 4,625,579 | 12/1986 | Spease | 74/502.4 |
| 4,694,705 | 9/1987 | Frankenhouse et al. | 74/502.4 X |
| 4,947,704 | 8/1990 | Gokee | 74/502.6 X |
| 5,207,116 | 5/1993 | Sultze | 74/502.6 X |

FOREIGN PATENT DOCUMENTS

| | | | |
|---|---|---|---|
| 250063 | 12/1987 | European Pat. Off. | 74/502.4 |
| 3003307 | 8/1981 | Fed. Rep. of Germany | 74/502.6 |

*Primary Examiner*—Leslie A. Braun
*Assistant Examiner*—Ryan W. Massey
*Attorney, Agent, or Firm*—Reising, Ethington, Barnard, Perry & Milton

[57] ABSTRACT

A motion transmitting remote control cable assembly (10) comprises a motion transmitting core element (12) having a terminal (14) attached to one of its ends, where the terminal includes a passageway (16). The assembly also includes a socket member (20) disposed in the passageway for interconnecting the core element (12) with a control element (18). The assembly (10) is characterized by including a separate isolator (22,22') interposed in the passageway (16) between the socket member (20) and the terminal (14) for dampening vibrations originating from the control element (18).

23 Claims, 3 Drawing Sheets

ISOLATED SHIFTER TERMINAL ASSEMBLY

TECHNICAL FIELD

The subject invention relates to motion transmitting remote control cable assemblies for transmitting motion in a curved path. The invention relates more particularly to core element terminals for interconnecting a core element and a control element.

BACKGROUND OF THE INVENTION

In push-pull assemblies where connections exist between a core element and a control member it is desirable to provide some kind of insulator or isolator to insulate the core element from the control member. This is particularly true in a gear shift assembly where the core element controls a control member which vibrates due to its connection to a transmission. Ideally, the isolator will absorb all of the vibration from the control member so that no vibration travels along the core element to the gear shifter. U.S. Pat. No. 4,327,600 to Bennett discloses a terminal having a socket member and an isolator for dampening vibration; but the isolator is only an "O" ring disposed between the control element and the socket member. It is still possible in such an arrangement for vibration to be transmitted from the control element to the terminal via the socket member. U.S. Pat. No. 4,581,953 to Walston et al. discloses a terminal having a socket member which is soft enough to serve as an isolator. But the relatively soft socket member does not have the retaining power of a harder, more rigid socket member. Nor does this arrangement provide the flexibility of allowing the socket member and the isolator to be inserted or replaced independently of one another. This flexibility can be important not only in the maintenance of the assembly, but also in allowing the assembly to be adapted for different applications.

SUMMARY OF THE INVENTION AND ADVANTAGES

A motion transmitting remote control cable assembly for transmitting motion in a curved path by a flexible motion transmitting core element comprises a motion transmitting core element having ends, a conduit slideably supporting said core element and a terminal attached to one of the ends of the core element where the terminal defines a passageway therethrough. The assembly also includes socket means disposed in the passageway for interconnecting the core element with a control element. The assembly is characterized by including separate isolator means interposed in the passageway between the socket means and the terminal for dampening vibrations originating from the control element and minimizing vibration transferred to the core element, the isolator means being disposed in the passageway independent of the socket means whereby the isolator means and the socket means may be replaced independently of one another.

This assembly combines the benefits of vibration dampening and strong retaining power. Moreover, having separate sockets and isolators allows the manufacturer flexibility in adapting the/assembly to the needs of different customers. For example, the "feel" of the shift can be changed simply by substituting one isolator for another. Or, one type of socket can be substituted easily for another to allow the terminal to facilitate several kinds of connections.

FIGURES IN THE DRAWINGS

Other advantages of the present invention will be readily appreciated as the same becomes better understood by reference to the following detailed description when considered in connection with the accompanying drawings wherein.

Figure 3:
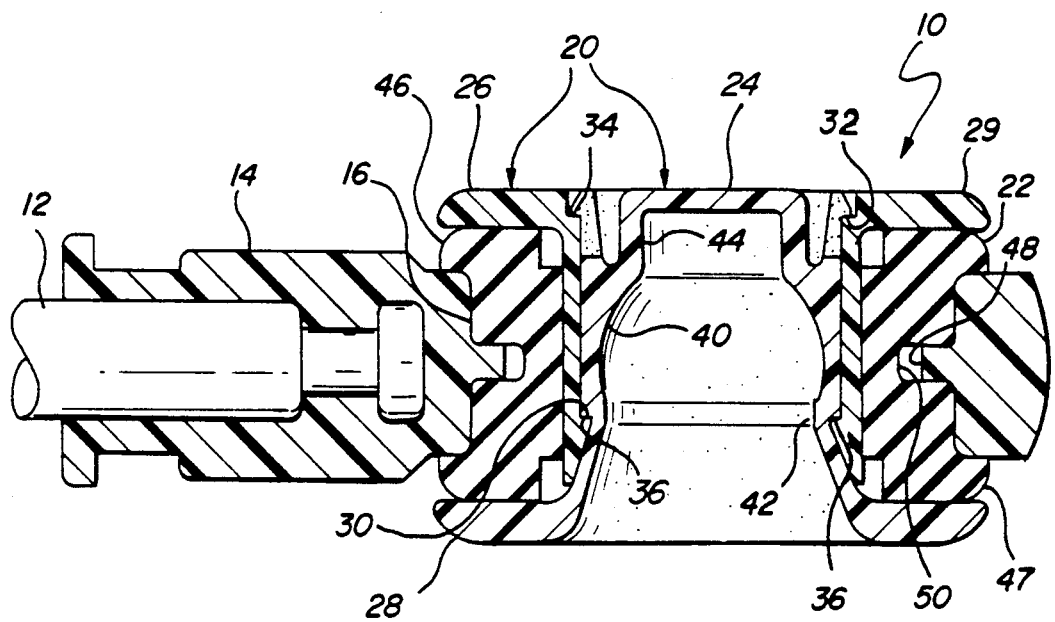

FIG. 3 a cross-sectional side view of a second embodiment of the subject invention engaging a ball connection and s a deflection limiting means.

Figure 4:
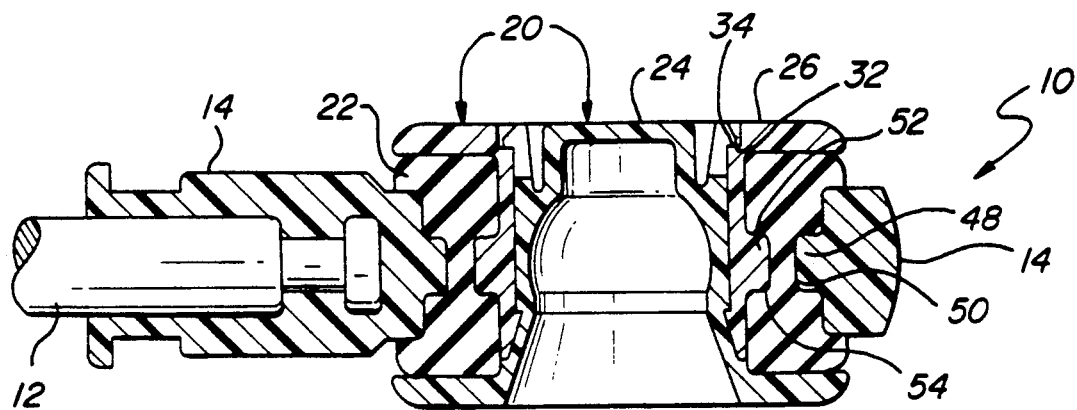
Figure 5:
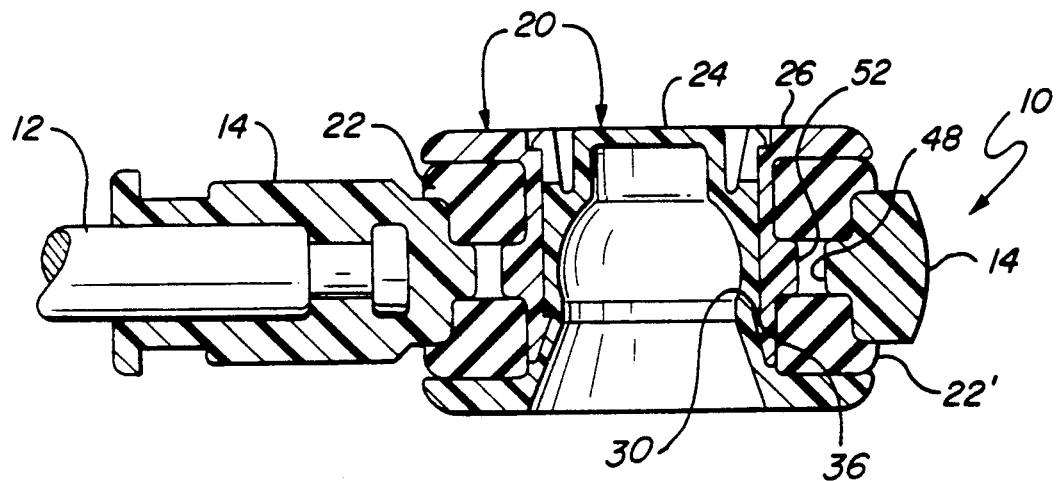

FIG. 4 a cross-sectional side view of a third embodiment of the subject invention showing another deflection limiting means; and FIG. 5 is cross-sectional side view of a fourth embodiment of the subject invention showing another deflection limiting means.

DESCRIPTION OF THE PREFERRED EMBODIMENT

A motion transmitting remote control cable assembly generally shown at 10 for transmitting motion in a curved path comprises a motion transmitting core element 12 having ends, a conduit (13) slideably supporting the core element, and a terminal 14 attached to one of the ends of the core element, where the terminal defines a passageway or eyelet 16 therethrough. The core element includes a flexible portion (not shown) and a rigid steel shaft 12 attached to the terminal 14. It is well known in the art to support at least the flexible portion of the core element in a conduit (not shown here), as shown in U.S. Pat. Nos. 4,581,953 and 4,694,705, the teachings of which are incorporated herein by reference. The assembly 10 also includes socket means generally indicated at 20 disposed in the passageway 16 for interconnecting the core element 12 with a control element 18. The assembly 10 is characterized by including separate isolator means 22,22° interposed in the passageway 16 between the socket means 20 and the terminal 14 for dampening vibrations originating from the control element 18 and minimizing vibration transferred to the core element 12, the isolator means 22,22' being disposed in the passageway 16 independent of the socket means 20 whereby the isolator means 22,22' and the socket means may be replaced independently of one another.

The socket means 20 includes first and second interconnected retaining means 24,26 interconnecting with one another within the passageway 16 of the terminal 14 for retaining the socket means 20 and the isolator means 22 to the terminal. The first interconnecting retaining means 24 includes a first cylindrical socket member 24 having a first end and a second end. The second end has a retaining flange 28 extending radially outwardly therearound. The second interconnecting retaining means 26 includes a second cylindrical socket member 26 having a first end and a second end. The second end has a retaining flange 29 extending radially outwardly therearound whereby the first and second socket members 24,26 interconnect within the passageway 16 of the terminal 14 to form a single socket assembly 24,26 with the retaining flanges 28,29 being in spaced apart parallel planes. This single socket assembly 24,26 is the socket means 20. The first and second socket members 24,26 interconnect by the first end of the first socket member 24 telescopingly engaging within the first end of the second socket member 26.

Figure 1:
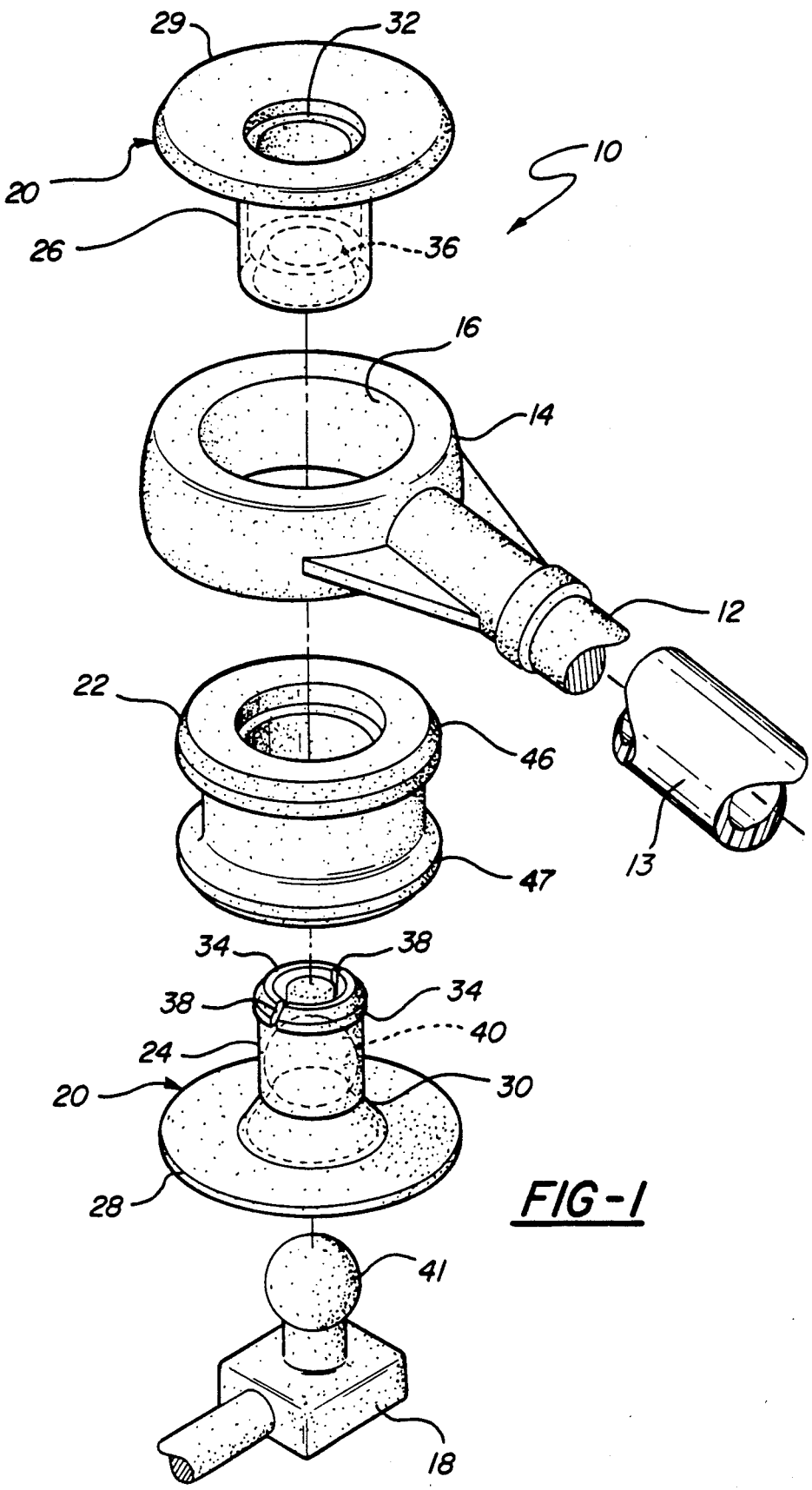
FIG. 1 is an exploded perspective view of the subject invention together with a control element having a ball connection.
Figure 2:
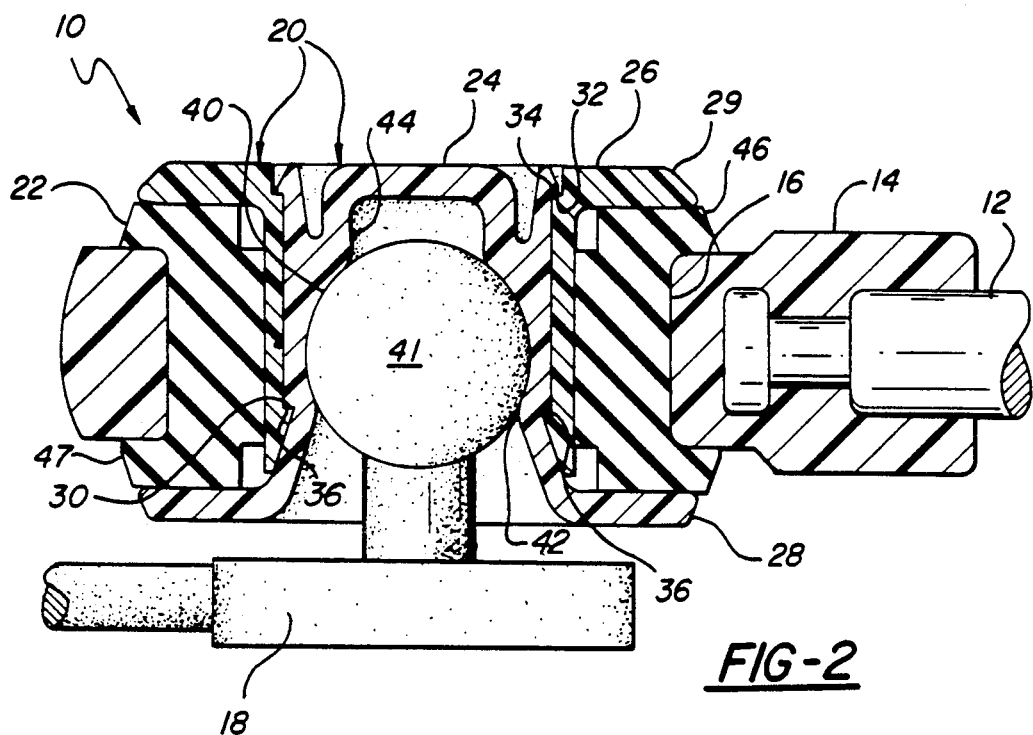
FIG. 2 is a cross-sectional side view of the subject invention en a ball connection.

The first and second socket members 24,26 are retained to one another with a particular retaining means. In the preferred embodiment, the first socket member 24 includes an inside surface and an outside surface, the first socket member 24 including a receiving flange or lip 30 extending radially inward from the outside surface toward the inside surface. As shown in FIGS. 2 and 3, this is toward the middle of the first socket member 24. The second socket member 26 includes an inside surface and an outside surface, with the second socket member 26 including a receiving flange or lip 32 extending radially from the inside surface toward the outside surface. As shown in FIGS. 2 and 3 this is very close to the second end of the second socket member 26.

The first socket member 24 includes a gripping flange 34 extending radially outwardly from the outside surface engaging with the receiving flange or lip 32 on the second socket member 26 to retain the first socket member 24 to the second socket member. The gripping flange 34 is an annular flange extending radially outwardly and is disposed very near the first end of the first socket member 24. In the preferred embodiment there are breaks 38 in the gripping flange 34 to define two semi-circular flanges. These breaks 38 allow each of the semi-circular flanges 34 to deflect slightly inwardly when the first socket member 24 is telescopingly disposed in the second socket member 26. If the breaks 38 were not used, the first socket member 24 would be more difficult to insert within the second socket member 26. Otherwise, the socket members 24,26 may need to be made of less rigid material to avoid deformation and assure retention.

The second socket member 26 includes a gripping flange 36 extending radially inwardly from the inside surface engaging with the receiving flange 30 on the first socket member 24 to retain the second socket member 26 to the first socket member. This gripping flange 36 is an annular flange extending radially inwardly and is disposed very near the first end of the second socket member.

The inside surface of the first socket member 24 defines a ball socket 40 for receiving a control element 18 having a ball connection 41. The ball socket 40 also includes a constriction or throat 42 constricting a portion of the socket and retaining the ball connection 41 in the ball socket. In this way the ball 41 actually snaps past the constriction 42 into the socket 40. The ball socket 40 finally includes a lubrication reservoir 44 for retaining lubrication for the ball and socket engagement. Many sizes of sockets may be used, and other types of sockets (i.e., non-ball sockets such as cylindrical sockets) may be used.

The first and second socket members 24,26 are made from some rigid elastomeric material, preferably a hard plastic. By the term "rigid," it is meant that the first and second socket members 24,26 are relatively more rigid than the isolator means 22,22'.

The terminal passageway 16 has a substantially cylindrical shape with a predetermined length and diameter. The retaining flanges 28,29 on the socket members have a diameter greater than the diameter of the passageway 16 through the terminal 14 whereby the retaining flanges 28,29 retain the socket assembly 24,26 in the passageway 16 of the terminal.

The isolator means 22,22' includes a grommet-shaped member or isolator 22 having an inner surface contacting the socket means 20, an outer surface contacting the terminal 14, an outer diameter generally equal to the diameter of the terminal passageway 16, and a length equal to the length of the passageway. The grommet-shaped member has a first end and a second end, and a first annular flange 46 adjacent the first end, and a spaced apart second annular flange 47 adjacent the second end. The flanges 46,47 have a diameter greater than the diameter of the terminal passageway 16 whereby the annular flanges 46,47 retain the grommet-shaped member 22 to the terminal 14 within the passageway and whereby the retaining flanges 28,29 of the socket assembly 24,26 are spaced apart from the terminal 14 by the flanges 46,47 on the grommet-shaped member 22. The grommet-shaped member 22 is made from a soft elastomeric material, usually EPDM material (elastomer from ethylene, propylene and diene). Grommet-shaped members having various hardnesses may be used to change the "feel" of the shift or to control the amount of vibration absorbed. The preferred type of grommet-shaped member has a Rockwell A hardness generally in the range of 40–80, usually somewhere around 50.

In an alternative embodiment, the terminal 14 includes deflection limiting means 48 for limiting the amount of deflection of the isolator or grommet-shaped member 22. In one embodiment the terminal 14 includes an annular deflection stop ridge 48 extending into the passageway 16. This ridge 48 is molded as part of the terminal passageway 16. The grommet-shaped member 22 includes an engaging groove or channel 50 extending radially inwardly from the outside surface for receiving the deflection ridge 48. In this embodiment, the grommet-shaped member 22 will be more securely attached to the terminal 14. The main purpose of this deflection ridge 48, though, is to limit or alter deflection characteristics of the grommet-shaped member 22 under a given axial load along the core element 12. In other words, the flexible grommet-shaped member 22 will allow some such deflection up to a given load level. Above this load level no more deflection takes place because of the deflection stop ridge 48 which stops against the outer wall of the second socket member 26. Several embodiments may be used to accomplish this limitation of deflection.

In another embodiment of the deflection limiting means shown in FIG. 4, the socket means 20 (i.e. the second socket member 26) includes an annular socket ridge 52 extending radially outwardly from the socket means 20 into an annular groove 54 on the inside surface of the isolator or grommet-shaped member 22. Thus there are two ridges 48,52 extending into the isolator 22 from opposite sides to limit deflection. In a further embodiment shown in FIG. 5, the isolator may comprise two pieces 22,22' spaced apart to define a space or channel for the socket ridge 52 and the deflection ridge 48 to fit into. The space may be varied to provide desired deflection characteristics.

To assemble the subject invention, one first inserts the relatively soft isolator or grommet-shaped member 22 into the passageway 16 of the terminal 14. The isolator 22 will deform slightly to fit through the passageway 16 until the flanges 46,47 emerge or "pop" out of the terminal 14 at either end. At this point the flanges 46,47 of the isolator 22 will retain the isolator in position in the passageway 16 unless a force over a predetermined threshold forces the isolator out of the passageway 16. Next, the first and second socket members 24,26 are inserted into opposite sides of the passageway 16 (now the passageway defined by the inside surface of the grommet-shaped member 22) and a force is applied to the socket members, forcing them to snap together. The first end of the first socket member 24 will engage within the second socket member 26. The semi-circular flanges 34 on the first member 24 will deflect slightly inwardly until, at a certain point they may bias back over the receiving flange or lip 32 on the second socket member 26. At the same time the gripping flange 36 on the second socket member 26 will engage the receiving flange 30 on the first socket member 24. The retaining flanges 28,29 on the socket assembly 24,26 may be snug against the flanges 46 on the isolator 22. As one can appreciate, the socket assembly 24,26 and the isolator 22 or isolators 22,22' are both retained in the passageway 16 by the retaining flanges 28,29 on the socket assembly 24,26.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A motion transmitting remote control cable assembly (10) for transmitting motion in a curved path by a flexible motion transmitting core element comprising:
    a motion transmitting core element (12) having ends;
    a conduit (13) slideably supporting said core element (12);
    a terminal (14) attached to one of said ends of said core element (12), said terminal defining a passageway (16) therethrough;
    socket means (20) disposed in said passageway (16) for interconnecting said core element (12) with a control element (18);
    characterized by including separate isolator means (22,22') interposed in said passageway (16) between said socket means (20) and said terminal (14) for dampening vibrations originating from the control element (18) and minimizing vibration transferred to said core element (12), said isolator means (22,22') being independent of said socket means (20).

2. An assembly as set forth in claim further characterized by said isolator means (22,22') being softer than said terminal (14) and said socket means (20).

3. An assembly (10) as set forth in claim 2 further characterized by said socket means (20) being made from a rigid elastomeric material.

4. An assembly (10) as set forth in claim 2 further characterized by said isolator means (22,22') being made from an elastomeric material softer than said socket means (20).

5. An assembly (10) as set forth in claim 1 further characterized by said socket means (20) including first and second interconnected retaining means (24,26) interconnecting with one another within said passageway (16) of said terminal (14) for retaining said socket means (20) and said isolator means (22,22') to said terminal.

6. An assembly (10) as set forth in claim 5 further characterized by said first interconnecting means (24) including a first cylindrical socket member (24) having a first end and a second end, said second end having a retaining flange (28) extending radially outwardly therearound.

7. An assembly (10) as set forth in claim 6 further characterized by said second interconnecting means (26) including a second cylindrical socket member (26) having a first end and a second end, said second end having a retaining flange (29) extending radially outwardly therearound whereby said first and second socket members (24,26) interconnect within said passageway (16) of said terminal (14) to form a socket assembly (24,26) with said retaining flanges (28,29) being in spaced apart parallel planes.

8. An assembly (10) as set forth in claim 7 further characterized by said first end of said first socket member (24) telescopingly engaging within said second socket member (26).

9. An assembly (10) as set forth in claim 8 further characterized by said first socket member (24) including an inside surface and an outside surface, said first socket member including a receiving lip (30) extending from said outside surface toward said inside surface.

10. An assembly (10) as set forth in claim 9 further characterized by said second socket member (26) including an inside surface and an outside surface, said second socket member including a receiving lip (32) extending from said inside surface toward said outside surface.

11. An assembly (10) as set forth in claim 10 further characterized by said first socket member (24) including a gripping flange (34) extending outwardly from said outside surface engaging with said receiving lip (32) on said second socket member (26) to retain said first socket member (24) to said second socket member.

12. An assembly (10) as set forth in claim 11 further characterized by said second socket member (26) including a gripping flange (36) extending inwardly from said inside surface engaging with said receiving lip (30) on said first socket member (24) to retain said second socket member (26) to said first socket member.

13. An assembly (10) as set forth in claim 9 further characterized by said inside surface of said first socket member (24) defining a ball socket (40) for receiving a control element (18) having a ball connection (41).

14. An assembly (10) as set forth in claim 13 further characterized by said ball socket (40) including a throat (42) constricting a portion of said socket and retaining the ball connection (41) in said ball socket.

15. An assembly (10) as set forth in claim 13 further characterized by said ball socket (40) including a lubrication reservoir (44) for retaining lubrication for the ball and socket engagement.

16. An assembly (10) as set forth in claim 7 further characterized by said terminal passageway (16) having a substantially cylindrical shape with a predetermined length and diameter.

17. An assembly (10) as set forth in claim 16 further characterized by said retaining flanges (28,29) on each of said socket members (24,26) having a diameter greater than said diameter of said passageway (16) through said terminal (14) whereby said retaining flanges (28,29) retain said socket assembly (24,26) in said passageway of said terminal.

18. An assembly (10) as set forth in claim 17 further characterized by said isolator means (22) including a grommet-shaped member (22) having an inner surface contacting said socket means (20), an outer surface contacting said terminal (14), an outer diameter generally equal to said diameter of said terminal passageway (16), and a length equal to said length of said passageway.

19. An assembly (10) as set forth in claim 18 further characterized by said grommet-shaped member (22) having a first end and a second end, and a first annular flange (46) adjacent said first end, and a spaced apart second annular flange (47) adjacent said second end, said flanges (46,47) having a diameter greater than said diameter of said terminal passageway (16) whereby said annular flanges (46,47) retain said grommet-shaped member (22) to said terminal (14) within said passageway (16) and whereby said retaining flanges (28) of said socket assembly (24,26) are spaced apart from said terminal (14) by said flanges (46,47) on said grommet-shaped member.

20. An assembly (10) as set forth in claim 1 further characterized by including deflection limiting means (48) for limiting the deflection of said isolator means (22,22') above a predetermined axial load along said core element (12).

21. An assembly (10) as set forth in claim 20 further characterized by said terminal (14) including an annular deflection ridge (48) extending into said passageway (16).

22. An assembly (10) as set forth in claim 21 further characterized by said isolator means (22,22') including an annular retaining groove (50) for receiving said retaining ridge (48).

23. An assembly (10) as set forth in claim 22 further characterized by said socket means (20) including an annular socket ridge extending radially outwardly therefrom.

* * * * *